United States Patent Office 3,277,081
Patented Oct. 4, 1966

3,277,081
NOVEL STEROID GUANYLHYDRAZONES AND
THEIR PRODUCTION
Karl-Heinz Meyer and Siegismund Schutz, Wuppertal-Elberfeld, Kurt Stoepel, Wuppertal-Vohwinkel, and Hans-Gunther Kroneberg, Haan, Rhineland, Germany, assignors to Farbenfabriken Bayer Aktiengesellschaft, Leverkusen, Germany, a corporation of Germany
No Drawing. Filed Jan. 15, 1964, Ser. No. 337,713
Claims priority, application Germany, Jan. 23, 1963, F 38,831
17 Claims. (Cl. 260—239.5)

This invention relates to novel steroid guanylhydrazones which are condensation products of steroids having more than one carbonyl function such as a steroid dione or trione with certain substituted aminoguanidines and the preparation of said steroid guanylhydrazones by the methods hereinafter described. The new condensation products and their acid salts possess beneficial cardio-tonic activity.

The action of aminoguanidine on steroid ketones which only contain a single carbonyl function has been described in two instances [J. Barnett and C. J. O. R. Morris, Biochemical Journal 40, 450 (1946), and M. Pesez, J. Bartos, J. Mathieu and J. Valls, Bull. Soc. Chim. France, 1958, 488]. In both instances, the reaction was carried out on ketones having a carbonyl group in the 3- or 17-position and the reaction products were employed for physical measurements.

German Patent No. 1,175,238 has as its object the preparation of condensation products from steroids having more than one carbonyl function and aminoguanidine or its salts. These condensation products exhibit cardiotonic activity.

It has now been found that novel condensation products with particularly valuable pharmaceutical properties can be obtained when steroids having more than one carbonyl function are reacted with substituted aminoguanidines of the formula:

$$H_2N-N-C-NH-B$$
$$\phantom{H_2N-N}|\phantom{C}\|$$
$$\phantom{H_2N-N-}E\phantom{C-}NA$$

or their salts.

In the above formula, A and E are each hydrogen or a branched, unbranched or alicyclic alkyl group with 1 to 6 carbon atoms; B is hydrogen, an alkyl chain of 1 to 6 carbon atoms which may also be connected to A, optionally via a hetero atom such as N, O or S, a nitro group or an amino group or a basic radical of the formula:

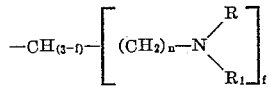

wherein $n$ is 0 to 8, $f$ is 1 or 2 and R and $R_1$ are each hydrogen or the same or different branched, unbranched or alicyclic alkyl groups with up to 6 carbon atoms, which may be connected with each other, optionally via a heteroatom such as N, S or O.

The novel compounds produced during the condensation, which may still contain free carbonyl functions, exhibit cardio-tonic activity.

The products produced according to the invention may be administered as such by themselves or in the form of their salts with non-toxic pharmaceutically acceptable inorganic or organic acids. Suitable acids are, for instance, hydrochloric acid, phosphoric acid, acetic acid, propionic acid, maleic acid, fumaric acid, succinic acid, tartaric acid, citric acid, salicylic acid, naphthalene-1,5-disulfonic acid, and the like.

The preparation of the novel compounds is carried out in any of the following ways:

(a) steroids with more than one carbonyl function are reacted with substituted aminoguanidines or their salts, or
(b) substituted thiosemicarbazones of steroids with more than one carbonyl function are reacted with amines, or
(c) substituted S-alkyl-isothiosemicarbazones of steroids with more than one carbonyl function are reacted with amines, or
(d) substituted hydrazones of steroids with more than one carbonyl function are reacted with cyanamides.

The substituted thiosemicarbazones, S-alkyl-isothiosemicarbazones and hydrazones of steroids having more than one carbonyl function which may be employed as the starting materials are obtained by reacting steroids having more than one carbonyl function with substituted thiosemicarbazides or substituted S-alkyl-isothiosemicarbazides or substituted thiosemicarbazides and alkyl halides or substituted hydrazines.

Suitable starting materials for the process according to the invention are, for instance, androst-4-ene-3,17-dione;
pregn-4-ene-3,20-dione;
pregn-4-ene-17,21-diol-3,11,20-trione;
pregna-1,4-diene-17,21-diol-3,11,20-trione;
pregn-4-ene-11β-17,21-triol-3,20-dione;
pregna-1,4-diene-11β,17,21-triol-3,20-dione;
pregn-4-ene-17,21-diol-3,20-dione;
pregnane-3,20-dione;
androstane-3,17-dione;
4-chloro-pregn-4-ene-3,20-dione;
5-cyano-pregnane-3,20-dione;
6-methyl-pregn-4-ene-3,20-dione;
4-methyl-pregn-4-ene-3,20-dione;
pregn-4-ene-17-ol-3,20-dione;
16-dehydro-pregn-4-ene-3,20-dione;
16,17-epoxy-pregn-4-ene-3,20-dione;
9α-fluoro-pregn-4-ene-11β,17,21-triol-3,20-dione;
9α-fluoro-pregna-1,4-diene-11β,17,21-triol-3,20-dione;
6-methyl-pregna-1,4-diene-11β,17,21-triol-3,20-dione;
6-methyl-9α-fluoro-pregna-1,4-diene-11β,17,21-triol-3,20-dione;
16-methyl-9α-fluoro-pregna-1,4-diene-11β,17,21-triol-3,20-dione;
9α,fluoro-pregna-1,4-diene-11β,16,17,21-tetraol-3,20-dione;
6-fluoro-16-methyl-pregna-1,4-diene-11β,17,21-triol-3,20-dione;
3,7,12-triketocholanic acid;
androsta-3,5-diene-7,17-dione;
andost-4-ene-3,11,17-trione;
pregn-4-ene-21-ol-3,20-dione;
pregn-5-ene-3-ol-7,20-dione, etc.

The invention is illustrated by the following non-limitative examples.

Example 1

A solution of 2.5 g. of 1-nitro-3-aminoguanidine in methanolic hydrochloric acid (pH=2) is treated with a solution of 3 g. of pregn-4-ene-3,20-dione in 150 ml. of methanol, and stirred at room temperature under nitrogen for 48 hours. The resultant precipitate is filtered off with suction and boiled out with water and methanol. 4 g. of pregn-4-ene-3,20-bis-(1-nitro-guanylhydrazone) of M.P. 216° C. (decomp.) are obtained.

Example 2

In analogous manner pregna-1,4-diene-17α,21-diol-11-one-3,20-bis-(1-nitro-guanylhydrazone) of M.P. 230° C. to 323° C. (decomp.) is prepared.

Example 3

3 g. of pregn-4-ene-3,20-dione are dissolved in methanol and treated with an aqueous solution of 4 g. of ethyleneaminoguanidine hydrobromide. 6.5 ml. of hydrobromic acid are added and the solution boiled for 4 hours. After cooling, the precipitate is filtered off with suction and recrystallized from water with the addition of ethanol. 4.3 g. of pregn-4-ene-3,20-bis-(ethylene-guanylhydrazone) of M.P. 245° C. to 247° C. are obtained. The product crystallizes with 1 mole of ethanol.

*Example 4*

5 g. of 1-methyl-3-aminoguanidine hydrochloride are dissolved in 250 ml. of methanol, treated with a solution of 3 g. of pregna-1,4-diene-17α,21-diol-3,11,20-trione in 400 ml. of methanol, and allowed to stand at room temperature for 48 hours. The solution is then stirred into 2 liters of ether, the resultant precipitate separated, boiled out with acetone and reprecipitated from alcohol with ether. 1.5 g. of the dihydrochloride of pregna-1,4-diene-17α,21-diol-11-one-3,20-bis-(1-methyl - guanylhydrazone) of M.P. 258° C. to 260° C. (decomp.) are obtained.

*Example 5*

7 g. of 1-(β-pyrrolidino-ethyl)-3-aminoguanidine hydroiodide are dissolved in methanolic hydrochloric acid (pH=2) and treated with a solution of 3 g. of pregn-4-ene-3,20-dione in 150 ml. of methanol. The solution is kept at room temperature under nitrogen for 48 hours and then stirred into 2 liters of ether. The precipitate is separated, boiled out with acetone and recrystallized from methanol/ethanol. 2 g. of the tetrahydrochloride of pregn-4-ene-3,20-bis-[1-(β-pyrrolidino-ethyl) - guanylhydrazone] of M.P. 274° C. to 276° C. (decomp.) are obtained.

*Example 6*

In analogous manner the tetrahydrochloride of pregna-1,4-diene-17α,21-diol-11-one-3,20-bis-[1-(β - pyrrolidino-ethyl)-guanylhydrazone] of M.P. 223° C. to 225° C. (decomp.) is prepared.

*Example 7*

7.5 g. of 1-(β-diethylamino-ethyl)-3-aminoguanidine hydrochloride are dissolved in 100 ml. of methanol and treated with a solution of 3 g. of pregn-4-ene-3,20-dione in 150 ml. of methanol. The solution is kept at room temperature under nitrogen for 48 hours and is then stirred into 2 liters of ether. The precipitate is separated, boiled out with acetone and recrystallized from ethanol with the addition of a little water. 2.5 g. of the tetrahydrochloride of pregn-4-ene-3,20-bis-[1-(β-diethylamino-ethyl)-guanylhydrazone] of M.P. 266° C. to 268° C. (decomp.) are obtained. The substance crystallizes with 1 mole of ethanol.

The following compounds are prepared in analogous manner as will be understood from the foregoing:

*Example 8*

The tetrahydrochloride of pregna-1,4 - diene - 17α,21-diol-11-one-3,20-bis-[1-(β-diethylamino - ethyl) - guanylhydrazone] of M.P. 216° C. to 219° C. (decomp.). The product crystallizes with 1 mole of ethanol.

*Example 9*

The tetrahydrochloride of pregn-4-en-11α-ol - 3,20 - bis-[1 - (β - diethylamino-ethyl) - guanylhydrazone] of M.P. 233° C. to 235° C. (decomp.). The substance crystallizes with 1 mole of ethanol.

*Example 10*

The tetrahydrochloride of 4-chloro-pregn-4-ene-3,20-bis-[1-(β-diethylamino-ethyl)-guanylhydrazone] of M.P. 247° C. to 249° C. (decomp.). The substance crystallizes with 1 mole of ethanol.

*Example 11*

The tetrahydrochloride of pregnane-3,20-bis-[1-(β-diethylamino-ethyl)-guanylhydrazone] of M.P. 243° C. to 245° C. (decomp.). The product crystallizes with 1 mole of ethanol.

*Example 12*

The tetrahydrochloride of androst - 4 - ene - 3,17 - bis-[1 - (β - diethylamino-ethyl) - guanylhydrazone] of M.P. 255° C. to 260° C. (decomp.). The substance crystallizes with 1 mole of ethanol.

*Example 13*

The tetrahydrochloride of 9α-fluoro-16α-methylpregna-1,4-diene-11β,17α,21-triol-3,20-bis-[1 - (β - diethylamino-ethyl)-guanylhydrazone] of M.P. 215° C. to 220° C. (decomp.). The substance crystallizes with 1 mole of ethanol.

*Example 14*

2 g. of 1-methyl-3-aminoguanidine hydrochloride are dissolved in methanol, treated with a solution of 1.8 g. of pregn-4-ene-3,20-dione in 100 ml. of ethanol and kept at room temperature under nitrogen for 3 days. It is then stirred into ether, the resultant preciptate is filtered off with suction, boiled out with acetone, and recrystallized from methanol.

Yield: 2 g. of the dihydrochloride of pregn-4-ene-3,20-bis-(1-methyl-guanylhydrazone) of M.P. 283° C. to 285° C. (decomp.).

The following are similarly prepared in analagous manner:

The dihydrochloride of pregn-4-ene-3,20-bis-(1-ethyl-guanylhydrazone) of M.P. 258° C. to 260° C. (decomp.).

The dihydrochloride of 19-nor-androst-4-ene-3,17-bis-(1-methyl-guanylhydrazone) of M.P. 230° C. to 232° C. (decomp.).

The hexahydrochloride of pregn - 4 - ene - 3,20 - bis-[1-(γ-N-methylpiperazino-propyl) - guanylhydrazone] of M.P. 276° C. to 278° C. The 1-(γ-N-methylpiperazino-propyl) - 3 - aminoguanidine trihydrochloride required as the starting material is obtained by reacting γ-N-methyl-piperazino-propylamine with N-amino-3-methyl - isothio-urea hydroiodide.

What is claimed is:

1. A steroid bis-guanylhydrazone condensation product of a steroid of the pregnane and androstane series having more than one carbonyl function and a compound selected from the group consisting of a substituted aminoguanidine and its acid salts, said substituted aminoguanidine having the formula:

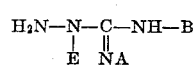

in which A and E are each selected from the group consisting of hydrogen and an alkyl group of 1 to 6 carbon atoms, and B is selected from the group consisting of hydrogen, alkyl of 1 to 6 carbon atoms, alkyl of 1 to 6 carbon atoms connected to A, alkyl of 1 to 6 carbon atoms connected to A via one of the heteroatoms nitrogen, oxygen and sulfur, nitro, amino and a basic radical of the formula:

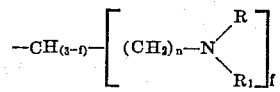

in which $n$ is an integer of 0 to 8, $f$ is one of the integers 1 and 2 and R and $R_1$ are selected from the group consisting of hydrogen, alkyl groups with up to 6 carbon atoms, said alkyl groups connected with each other and said alkyl groups connected with each other via one of the hetero-atoms nitrogen, sulfur and oxygen.

2. The compound pregn-4-ene-3,20-bis-(1-nitro-guanylhydrazone).

3. The compound pregna-1,4-diene-17α,21-diol-11-one-3,20-bis-(1-nitro-guanylhydrazone).

4. The compound pregn-4 - ene - 3,20 - bis - (ethylene-guanylhydrazone).

5. The dihydrochloride of the compound pregna-1,4-diene-17α,21-diol-11-one-3,20-bis - (1 - methyl - guanylhydrazone).

6. The tetrahydrochloride of the compound pregn-4-ene-3,20-bis-[1-(β-pyrrolidino-ethyl)-guanylhydrazone].

7. The tetrahydrochloride of the compound pregna-1,4-diene-17α,21-diol-11-one-3,20-bis-[1 - (β - pyrrolidino-ethyl)-guanylhydrazone].

8. The tetrahydrochloride of the compound pregn-4-ene-3,20-bis-[1-(β - diethylamino - ethyl) - guanylhydrazone].

9. The tetrahydrochloride of the compound pregna-1,4-diene-17α,21-diol-11-one-3,20-bis - [1 - (β - diethylamino-ethyl)-guanylhydrazone].

10. The tetrahydrochloride of the compound pregn-4-en-11α-ol-3,20-bis-[1-(β - diethylamino-ethyl) - guanylhydrazone].

11. The tetrahydrochloride of the compound 4-chloro-pregn-4-ene-3,20-bis-[1-(β-diethylamino-ethyl) - guanylhydrazone].

12. The tetrahydrochloride of the compound pregnane-3,20-bis-[1-(β-diethylamino-ethyl)-guanylhydrazone].

13. The tetrahydrochloride of the compound 9α-fluoro-16α-methylpregna-1,4-diene - 11β,17α,21 - triol - 3,20 - bis-[1-(β-diethylamino-ethyl)-guanylhydrazone].

14. The dihydrochloride of the compound pregn-4-ene-3,20-bis-(1-methyl-guanylhydrazone).

15. The dihydrochloride of the compound pregn-4-ene-3,20-bis-(1-ethyl-guanylhydrazone).

16. The dihydrochloride of the compound 19-nor-androst-4-ene-3,17-bis-(1-methyl-guanylhydrazone).

17. The hexahydrochloride of the compound pregn-4-ene-3,20-bis-[1-(γ-N-methylpiperazino-propyl) - guanylhydrazone].

References Cited by the Examiner

Barnett et al., "Biochem. Jour.," Vol. 40, pp. 450–53 (1946).

Pesez et al., "Bull. Soc. Chim. France," pages 488–90 (1958).

LEWIS GOTTS, *Primary Examiner.*

HENRY A. FRENCH, *Assistant Examiner.*